(12) United States Patent
Badie, Jr.

(10) Patent No.: US 12,449,181 B2
(45) Date of Patent: Oct. 21, 2025

(54) PORTABLE BEACH COOLER

(71) Applicant: Lorenzo Badie, Jr., Riviera Beach, FL (US)

(72) Inventor: Lorenzo Badie, Jr., Riviera Beach, FL (US)

( * ) Notice: Subject to any disclaimer, the term of this patent is extended or adjusted under 35 U.S.C. 154(b) by 838 days.

(21) Appl. No.: 17/713,682

(22) Filed: Apr. 5, 2022

(65) Prior Publication Data

US 2022/0325935 A1    Oct. 13, 2022

Related U.S. Application Data

(60) Provisional application No. 63/172,236, filed on Apr. 8, 2021.

(51) Int. Cl.
*F25D 3/06* (2006.01)
*B60L 1/00* (2006.01)
*B62B 5/00* (2006.01)

(52) U.S. Cl.
CPC ............... *F25D 3/06* (2013.01); *B60L 1/006* (2013.01); *B62B 5/0033* (2013.01); *B62B 2202/023* (2013.01); *B62B 2202/52* (2013.01); *B62B 2204/04* (2013.01); *B62B 2204/06* (2013.01); *B62B 2301/256* (2013.01); *F25D 2201/14* (2013.01); *F25D 2303/0822* (2013.01)

(58) Field of Classification Search
CPC ............ F25D 3/06; F25D 2201/14; F25D 2303/0822; F25D 17/06; F25D 2400/361; F25D 2400/38; F25D 3/08; F25D 31/007; B60L 1/006; B60L 1/003; B62B 5/0033; B62B 2202/023; B62B 2202/52; B62B 2204/04; B62B 2204/06; B62B 2301/256
See application file for complete search history.

(56) References Cited

U.S. PATENT DOCUMENTS

| | | | |
|---|---|---|---|
| 6,595,016 B1 | 7/2003 | Demirkiran | |
| 7,735,334 B2 | 6/2010 | Johnson | |
| 7,798,886 B1 * | 9/2010 | Williamson | B62D 55/24 446/456 |
| 9,849,901 B2 | 12/2017 | Jackman | |
| 10,486,726 B1 | 11/2019 | Logan | |
| 11,631,912 B2 * | 4/2023 | Hori | F25D 11/003 429/62 |
| 2009/0301122 A1 | 12/2009 | Grözinger | |

(Continued)

*Primary Examiner* — Jerry-Daryl Fletcher
*Assistant Examiner* — Dario Antonio Deleon

(57) ABSTRACT

A portable beach cooler is capable of reducing the temperature of stored items. A main cooling body opens to reveal an ice tray. The ice tray may be connected to a lifting mechanism that allows the ice tray to rise for convenient user access to ice. The lid of the cooling body may have several cupholders traversing through the lid, providing direct access to ice for contained beverages. A cupholder adapter may support beverages atop the lid or may be inverted atop a beverage contained within the cupholder to provide direct beverage access to ice while simultaneously preventing cold air from escaping. A set of tracked wheels is connected to a motorized frame capable of supporting the cooling body. The apparatus may further be equipped with cameras to allow for automatic maneuvering of the motorized frame behind a user, as well as a variety of other electronic ports and devices.

16 Claims, 7 Drawing Sheets

(56) References Cited

U.S. PATENT DOCUMENTS

| | | | |
|---|---|---|---|
| 2013/0048648 A1* | 2/2013 | Robertson et al. | F25D 3/06 220/592.02 |
| 2015/0021106 A1 | 1/2015 | LaRosa | |
| 2015/0285278 A1* | 10/2015 | Clafin et al. | B64D 11/00 248/318 |
| 2017/0101301 A1* | 4/2017 | Volin | F25D 3/06 |
| 2019/0128589 A1* | 5/2019 | Adams et al. | F25D 3/08 |
| 2020/0240704 A1* | 7/2020 | Deisley et al. | F25D 31/007 |
| 2020/0276998 A1* | 9/2020 | Coats et al. | B62B 3/005 |
| 2021/0022496 A1* | 1/2021 | Panda et al. | F25D 25/025 |
| 2022/0026132 A1* | 1/2022 | Gransden | F25D 3/08 |
| 2022/0114853 A1* | 4/2022 | Emde et al. | F25D 3/08 |
| 2022/0154411 A1* | 5/2022 | Henry et al. | F25D 3/08 |
| 2022/0228794 A1* | 7/2022 | Whyman et al. | F25D 3/06 |
| 2022/0289462 A1* | 9/2022 | Papera | F25D 3/08 |

* cited by examiner

PORTABLE BEACH COOLER

The current application claims a priority to the U.S. Provisional Patent application Ser. No. 63/172,236 filed on Apr. 8, 2021.

FIELD OF THE INVENTION

The present invention relates generally to a portable, thermally-regulated storage device. More specifically, the present invention relates to a portable beach cooler capable of storing drinks and ice for later consumption and of automatically navigating across sand and other surfaces. An internal ice tray automatically lifts and opens for convenient access to ice and to allow for direct cooling of beverages placed within cupholders atop the cooler lid.

BACKGROUND OF THE INVENTION

For coastal cities and areas, summertime represents an opportunity to enjoy the beach. Every year, billions of beach enthusiasts pack cars full of belongings and head for the nearest sandy shore, ready to soak in the sunny days. In addition to swimsuits, towels, umbrellas, sports items, books, surf boards and the like, belongings often include food and beverage items. Such items generally either require low temperatures in order to ensure food safety or benefit from improved taste as a result of being chilled. This need has resulted in the creation of a wide variety of spacious, temperature-controlling devices, among which the cooler is the most common and widely used.

Unfortunately, while coolers do allow for the cooling and transportation of food items, such devices experience several drawbacks. Coolers become very heavy when filled with ice or ice packs and may therefore be difficult to lift or otherwise transport, rendering them ineffective for transporting large food and beverage loads. Such coolers are also generally barren of other desirable features. The cooler has the potential to serve as a meeting hub for beachgoers, providing not just food and beverages, but also entertainment, power, sound, and more. In addition, the traditional cooler does not optimally leverage cold zones to allow for cooling of beverages placed atop the lid. What is needed is a device capable of maintaining a low temperature environment for the storage and transportation of food and beverages. Further desirable is a device capable of automatically carrying contained items to destinations with minimal user assistance.

The present invention addresses these issues. The portable beach cooler is a device capable of sustaining a low internal temperature for storage of temperature-sensitive items. The main cooling body opens to reveal an ice tray with a hinged gate for easy access. The ice tray may be connected to an automatic lifting mechanism that allows the ice tray to rise for convenient user access to ice. The lid of the cooling body may have several cupholders that traverse into the ice tray, providing direct access to ice for contained beverages. A cupholder adapter can be used to support beverages atop the lid or may be inverted atop a beverage contained directly within the cupholder to provide direct beverage access to ice while simultaneously preventing cold air from escaping. A set of tracked wheels is connected to a motorized frame that is capable of supporting the cooling body. The present invention may further be equipped with cameras to allow for automatic maneuvering of the motorized frame behind a user, as well as a variety of other electronic devices such as chargers, speakers, and more.

DETAILED DESCRIPTION OF THE INVENTION

All illustrations of the drawings are for the purpose of describing selected versions of the present invention and are not intended to limit the scope of the present invention.

Figure 1:
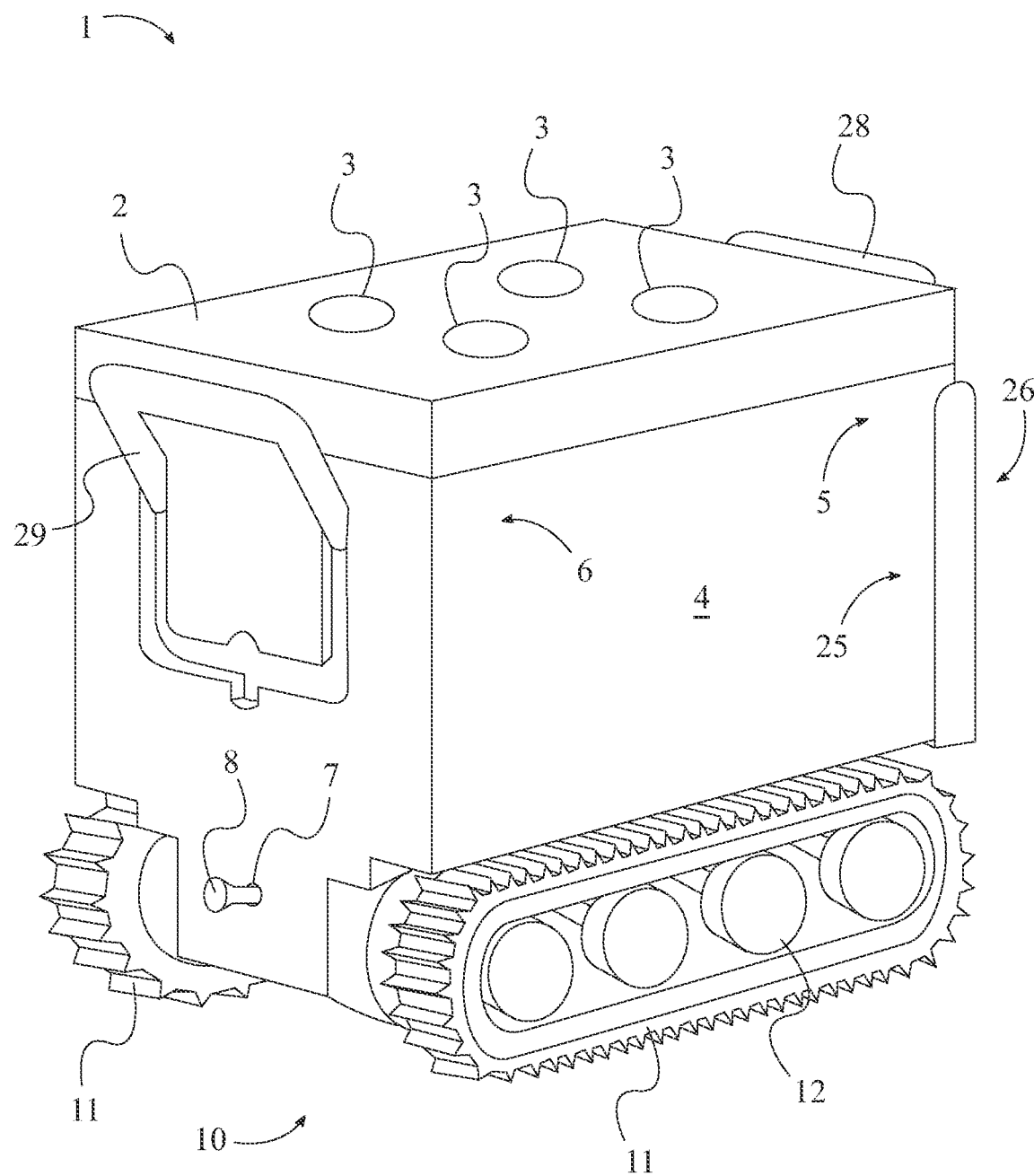
FIG. 1 is a left perspective view of the present invention.

The present invention is a portable beach cooler that is used to thermally insulate items, especially food and beverages, while traveling. The present invention is also configured to allow for automatic terrain traversal over sand or other surfaces. The present invention comprises a thermally-insulative receptacle 1, a plurality of receptacle wheels 9, a tracked wheel assembly 10, an ice basket 13, and a controller 20. The thermally-insulative receptacle 1, as shown in FIG. 1, is a container that is lined with, made of, or generally integrated with any of a variety of thermally-insulative materials, thus enabling support of a low-temperature environment. The plurality of receptacle wheels 9 is a set of cylindrical units capable of supporting the thermally-insulative receptacle 1 during transportation that allow for manual traversal of terrain, if preferred by a user. In an exemplary embodiment, the plurality of receptacle wheels 9 may be slidably mounted to the thermally-insulative receptacle 1. This arrangement allows the plurality of receptacle wheels 9 to slide away from the ground while the tracked wheel assembly 10 is in use. The tracked wheel assembly 10 is an attachable mechanism that allows the present invention to automatically, or in response to user inputs from remote controls, navigate and move in proximity to the user, allowing for automatic traversal of terrain. The ice basket 13 is a perforated container into which ice cubes, ice packs, and other such cooling devices may be placed in order to generate a cool environment within the thermally-insulative receptacle 1. The controller 20 is an electronic device capable of accepting sensor input signals, applying programmed logic, storing relevant data, and remotely or directly relaying corresponding output command signals to appropriate devices. The controller 20 may also generally include a variety of portable power supplies, including batteries, solar panel systems, and any or any combination of other components and connections necessary for providing appropriate electrical power to the various sensors, subsystems, and more of the present invention. The controller 20 may use a variety of short-range or long-range wireless connections to receive navigational commands from a personal computing (PC) device of a user and relay those commands to the tracked wheel assembly 10, thereby allowing for remote control of the movement and other functions of the present invention.

Figure 5:
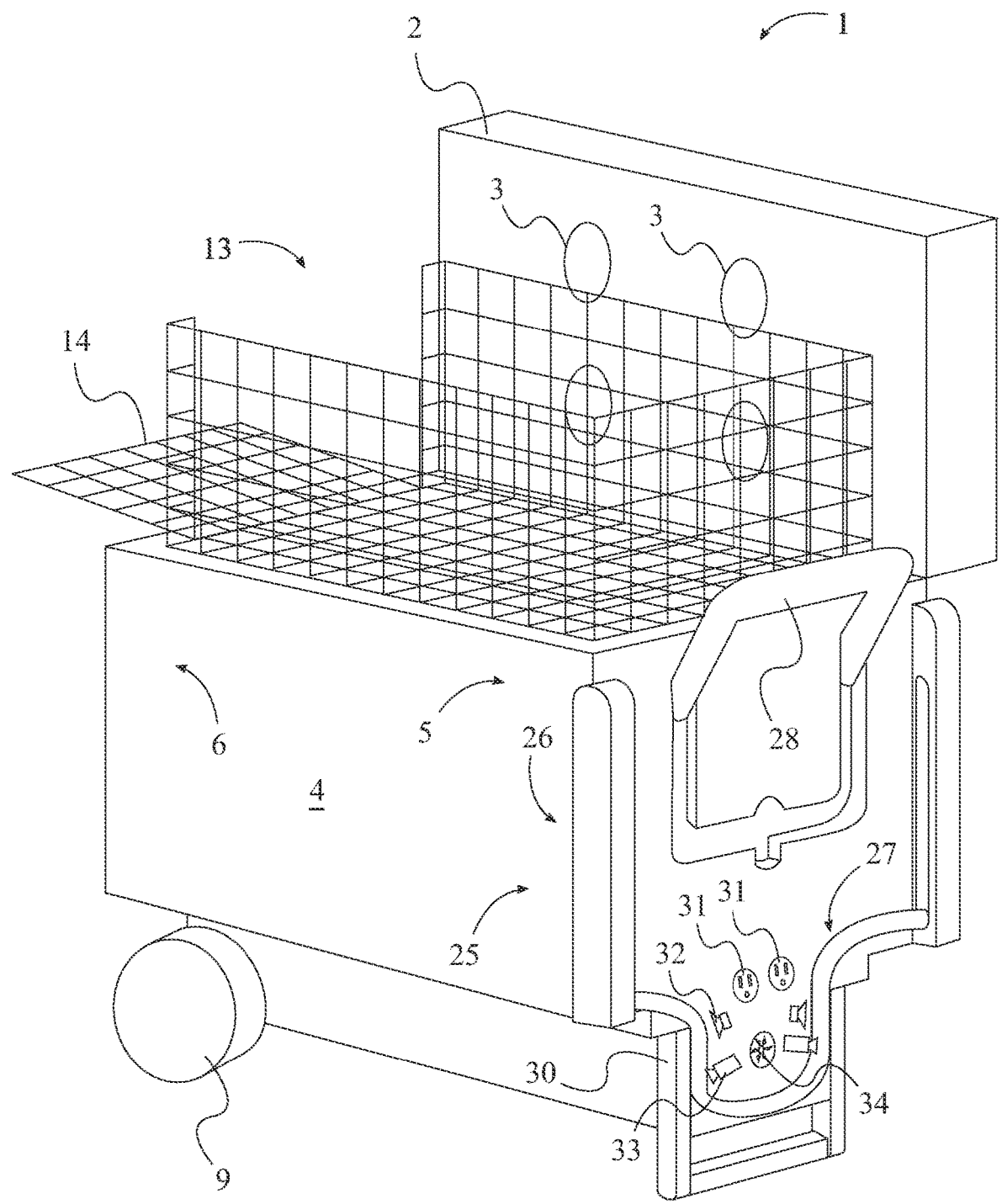
FIG. 5 is a right perspective view of the present invention with the ice basket extended and the receptacle lid open.

The general configuration of the aforementioned components allows the present invention to efficiently and effectively provide a portable, low-temperature space for storing items. The thermally-insulative receptacle 1 comprises an insulative lid 2 and an insulative body 4, as shown in FIG. 5. The insulative lid 2 is an adjustable panel that may be opened or closed to allow for access to the contents of the thermally-insulative receptacle 1. The insulative body 4 is a container that provides storage space for food items, the ice basket 13, and more. The insulative lid 2 may be hingedly connected onto the insulative body 4. This arrangement allows the user to access the contents of the insulative body 4 by actuating the insulative lid 2. The insulative lid 2 may be hermetically sealed over the insulative body 4. In this way, cold air cannot escape the insulative body 4 between the insulative body 4 and the insulative lid 2 while the thermally-insulative receptacle 1 is closed. The plurality of receptacle wheels 9 may be rotatably mounted onto the thermally-insulative receptacle 1, opposite the insulative lid 2. Thus, the user may transport the thermally-insulative receptacle 1 by balancing the thermally-insulative receptacle 1 onto the plurality of receptacle wheels 9 and subsequently pulling the thermally-insulative receptacle 1 to a desired destination. The thermally-insulative receptacle 1 may be removably attached to the tracked wheel assembly 10. This arrangement allows the thermally-insulative receptacle 1 to be supported above the ground by the tracked wheel assembly 10. The ice basket 13 may be adjustably mounted within the insulative body 4. In this way, the contents of the ice basket 13 may experience enhanced thermal retention from the thermally-insulative receptacle 1. Also, the tracked wheel assembly 10 and the ice basket 13 may be electronically connected to the controller 20. This arrangement allows the controller 20 to relay command signals to the tracked wheel assembly 10 and the ice basket 13, thereby allowing for automatic movement of the thermally-insulative receptacle 1 atop the tracked wheel assembly 10 and for automatic control over the position of the ice basket 13 relative to the insulative body 4.

Figure 6:
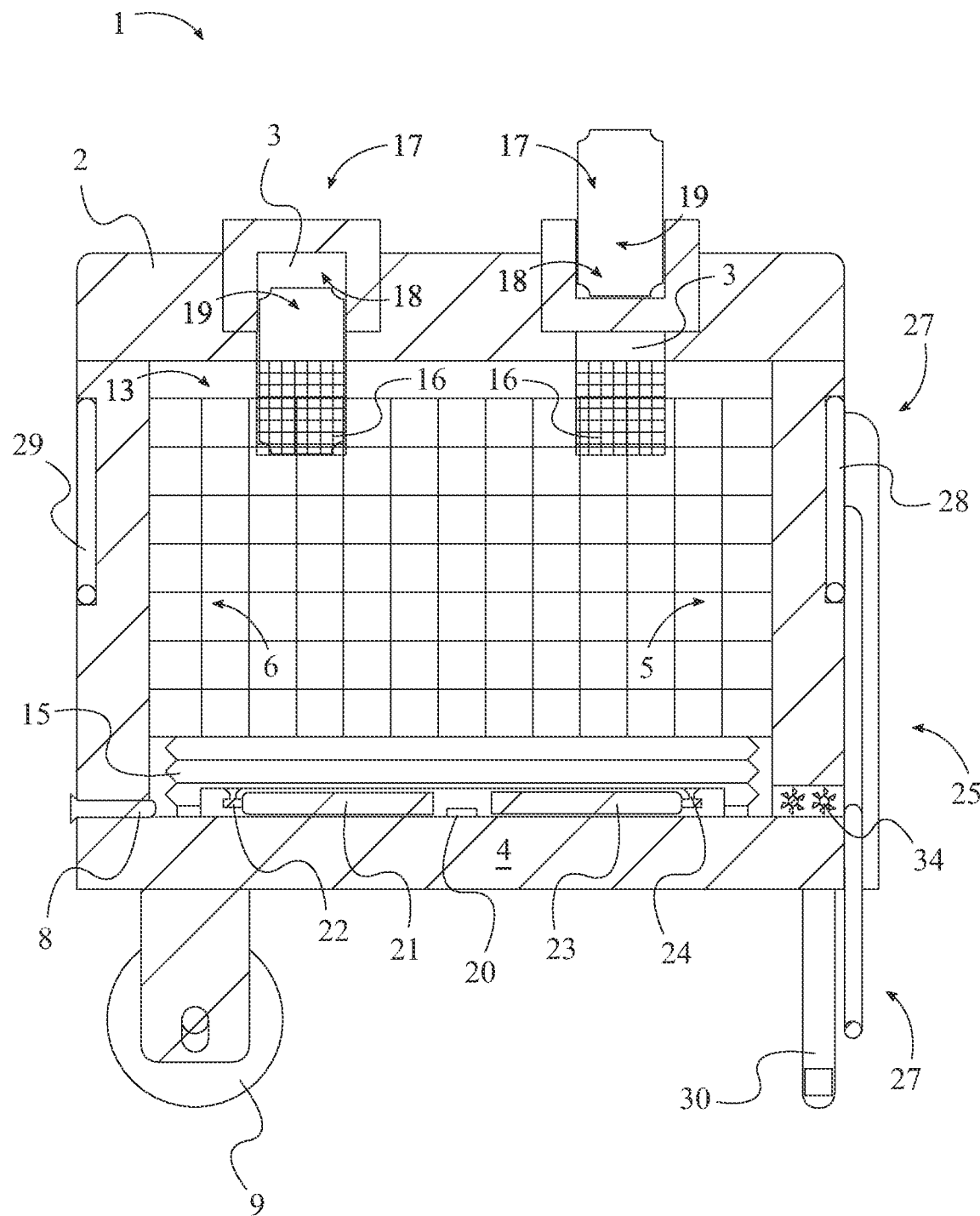
FIG. 6 is a schematic diagram representing a sectional view of the present invention.

A user of the present invention may wish to store full beverage receptacles, such as cups, bottles, and more, on top of the insulative lid 2 while simultaneously chilling the beverages. To allow for this, the present invention may further comprise a plurality of permeable beverage supports 16, as shown in FIG. 6. The plurality of permeable beverage supports 16 is a web of interconnected, generally flexible material, such as rope, cords, cables, wire, or more, which may be used to support a beverage receptacle. The insulative lid 2 may further comprise a plurality of cupholder openings 3. The plurality of cupholder openings 3 is a set of generally annular cuts into which a beverage receptacle may fit. The plurality of cupholder openings 3 may traverse through the insulative lid 2. This arrangement allows contained beverages to access the cold environment within the insulative body 4. The plurality of permeable beverage supports 16 may be positioned within the insulative body 4. In this way, each of the plurality of permeable beverage supports 16 may support items from below, preventing items from falling into the insulative body 4. In an exemplary embodiment, the plurality of permeable beverage supports 16 may traverse into the ice basket 13. This arrangement allows contained beverages and items to contact ice directly, thus enabling faster cooling of the contained beverages. The plurality of permeable beverage supports 16 may be terminally connected to the plurality of cupholder openings 3. Thus, the plurality of permeable beverage supports 16 may be positioned appropriately to allow beverages and other contained items to access the low temperature environment contained within the insulative body 4.

The plurality of cupholder openings 3 may enable the escape of cold air through the insulative lid 2. To prevent this, the present invention may further comprise at least one invertible cupholder cap 17, as shown in FIG. 6. The at least one invertible cupholder cap 17 is a generally rigid unit capable of temporarily blocking an opening of the plurality of cupholder openings 3. Each of the at least one invertible cupholder cap 17 may comprise a closed cap portion 18 and an open cap portion 19. The closed cap portion 18 is a segment of the at least one invertible cupholder cap 17 that prevents the escape of cold air through the at least one invertible cupholder cap 17. The open cap portion 19 is a segment of the at least one invertible cupholder cap 17 which protects an item, especially a beverage. Each of the at least one invertible cupholder cap 17 may be attached onto one opening of the plurality of cupholder openings 3. In this way, the at least one invertible cupholder cap 17 may be used to prevent the escape of cold air through the insulative lid 2. The open cap portion 19 may be positioned adjacent to the insulative lid 2. Thus, each cap of the at least one invertible cupholder cap 17 is arranged to serve as a stopper, preventing the escape of cold air through a corresponding opening of the plurality of cupholder openings 3. In an exemplary embodiment, the at least one invertible cupholder cap 17 may further comprise a cooling coil. The cooling coil is a helical tube which may be used as an enhanced cooling mechanism. The cooling coil may be integrated into the open cap portion 19. This arrangement allows the cooling coil to directly contact a beverage receptacle. The cooling coil may utilize a pump system to allow cooling fluid from the insulative body 4 to flow around the open cap portion 19, thus allowing for liquid-cooling of contained beverages.

The at least one invertible cupholder cap 17 may be utilized as a beverage protector and as an extension of the cold volume within the thermally-insulative receptacle 1. To this end, each of the at least one invertible cupholder cap 17 may be arranged in a cooling configuration, as shown in FIG. 6. The cooling configuration is an arrangement in which a beverage may be supported between the plurality of permeable beverage supports 16 and the closed cap portion 18, thus exposing the beverage to cold air and ice while simultaneously preventing loss of cold air through the plurality of cupholder openings 3. The closed cap portion 18 may be positioned offset from the insulative lid 2, opposite the plurality of permeable beverage supports 16. In this way, the at least one invertible cupholder cap 17 may be used to cover a beverage that is being cooled within the insulative body 4.

Conversely, the at least one invertible cupholder cap 17 may be utilized as a beverage cupholder while simultaneously acting as a stopper for cold air. To this end, each of the at least one invertible cupholder cap 17 may be arranged in a beverage-access configuration, as shown in FIG. 6. The beverage-access configuration is an arrangement in which a beverage may be supported atop the closed cap end, thus providing convenient access to a user. The closed cap portion 18 may be positioned offset from the insulative lid 2, adjacent to the plurality of permeable beverage supports 16. In this way, the at least one invertible cupholder cap 17 may be used to support a beverage that is being intermittently consumed. In an exemplary embodiment, the closed cap portion 18 in the beverage-access configuration may be supported by the plurality of permeable beverage supports 16. Alternatively, a ridge of the open cap portion 19 may be supported by the plurality of cupholder openings 3. Many support mechanisms are possible without departing from the dual-purpose nature of the at least one invertible cupholder cap 17.

A user may wish to access ice, ice packs, or other contents of the ice basket 13 during use. To allow for this, the ice basket 13 may comprise a basket height adjustment mechanism 15 and a basket gate 14, as shown in FIG. 5. The basket height adjustment mechanism 15 denotes an inflatable, extendible, or otherwise expanding device that may support the ice basket 13. The basket gate 14 is a segment of the ice basket 13 that may hinge open or closed to provide or restrict access to the contents of the ice basket 13. The basket gate 14 may be hingedly connected to the ice basket 13, adjacent to the basket height adjustment mechanism 15. This arrangement allows the basket gate 14 to toggle open or closed, either in response to direct manipulation by a user or automatically as the basket gate 14 moves in accordance with the basket height adjustment mechanism 15. The ice basket 13 may be mounted onto the basket height adjustment mechanism 15. Thus, the ice basket 13 may rise within the insulative body 4, allowing for contained ice to rise into contact with beverages within the plurality of cupholder openings 3.

The basket height adjustment mechanism 15 must be capable of changing the vertical position of the ice basket 13 within the insulative body 4. To this end, the present invention may further comprise a pressure receptacle 21, a pressure valve 22, a vacuum receptacle 23, and a vacuum valve 24, as shown in FIG. 6. The pressure receptacle 21 is a tank capable of storing pressurized air. The pressure valve 22 is the adjustable release mechanism that allows for pressurized air to escape from the pressure receptacle 21. The vacuum receptacle 23 is a tank capable of sustaining a low-pressure environment. The vacuum valve 24 is the adjustable release mechanism that allows air to enter the vacuum receptacle 23, thereby creating a low-pressure environment within the thermally-insulative receptacle 1. The pressure receptacle 21 and the vacuum receptacle 23 may be mounted within the insulative body 4. This arrangement allows insulative body 4 to provide physical protection of the pressure receptacle 21 and the vacuum receptacle 23. The pressure valve 22 may be operatively integrated into the pressure receptacle 21, wherein the pressure valve 22 is used to regulate fluid flux across the pressure receptacle 21. In this way, the pressure valve 22 may be toggled, either manually or automatically, to allow for the pressurized air within the pressure receptacle 21 to escape the pressure receptacle 21. Similarly, the vacuum valve 24 may be operatively integrated into the vacuum receptacle 23, wherein the vacuum valve 24 is used to regulate fluid flux across the vacuum receptacle 23. This arrangement allows the pressure valve 22 to be toggled either manually or automatically, to allow for air to enter the vacuum receptacle 23. The pressure receptacle 21 may be operatively connected to the basket height adjustment mechanism 15 through the pressure valve 22, wherein the pressure receptacle 21 controls the basket height adjustment mechanism 15 in conjunction with the vacuum receptacle 23. In this way, the height of the basket height adjustment mechanism 15 may increase due to pressurized air expanding the basket height adjustment mechanism 15, consequently lifting the ice basket 13. Similarly, the vacuum receptacle 23 may be operatively connected to the basket height adjustment mechanism 15 through the vacuum valve 24, wherein the vacuum receptacle 23 controls the basket height adjustment mechanism 15 in conjunction with the pressure receptacle 21. Thus, the vacuum receptacle 23 may fill with air from the basket height adjustment mechanism 15, thereby lowering the height of the basket height adjustment mechanism 15, and consequently, the ice basket 13. The pressure valve 22 and the vacuum valve 24 may be electronically connected to the controller 20. In this way, the pressure valve 22 and the vacuum valve 24 may open or close in response to inputs received by the controller 20.

Coolers often remain unnecessarily heavy due to additional weight from water that has melted inside. To address this issue, the thermally-insulative receptacle 1 may further comprise a drainage opening 7 and a drainage plug 8, as shown in FIG. 1. The drainage opening 7 is a hole generally near the bottom of the insulative body 4 through which fluids may exit the cooler. The drainage plug 8 is a removable stopper that prevents sand, rocks, or other external debris from entering the insulative body 4. The drainage opening 7 may traverse through the insulative body 4, opposite the insulative lid 2. In this way, water may collect adjacent to the drainage opening 7. The drainage plug 8 may be hermetically attached through the drainage opening 7. This arrangement prevents fluids from exiting the insulative body 4 through the drainage opening 7 undesirably while also preventing debris from entering the insulative body 4.

Figure 4:
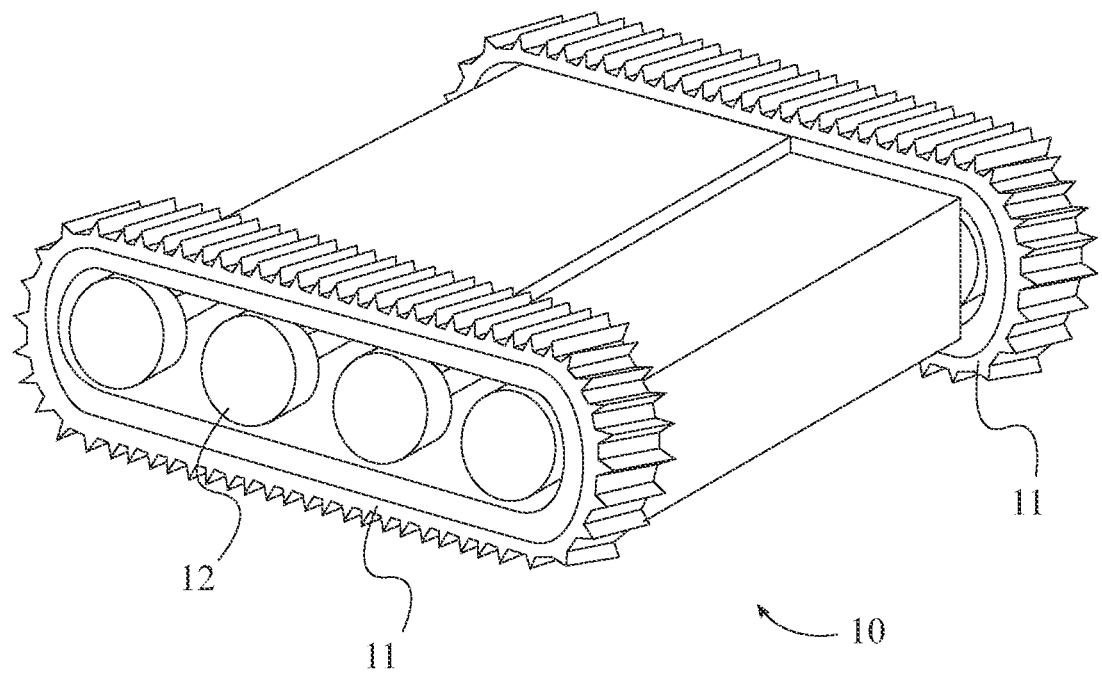
FIG. 4 is a right perspective view of the tracked wheel assembly of the present invention.

The tracked wheel assembly 10 must be capable of navigating efficiently across sand and other surfaces. To this end, the tracked wheel assembly 10 may comprise a motorized axle mechanism 12 and a plurality of tracked wheels 11, as shown in FIG. 4. The motorized axle mechanism 12 is a unit which includes several axles, motors, transmissions, gearboxes, and other such components necessary for supporting the insulative body 4, arranging the plurality of tracked wheels 11, and communicating with the controller 20. The plurality of tracked wheels 11 is a set of aligned wheels connected by an elongated, preferably polymeric band of tracked tread. The plurality of tracked wheels 11 may be rotatably mounted onto the motorized axle mechanism 12. This arrangement allows the plurality of tracked wheels 11 to traverse terrain that is difficult to cross with standard wheels. The motorized axle mechanism 12 may be removably attached to the thermally-insulative receptacle 1, adjacent to the plurality of receptacle wheels 9. In this way, a user may decide whether it is appropriate to have the present invention automatically follow the user or if it is preferable to manually guide the present invention to the destination.

Figure 2:
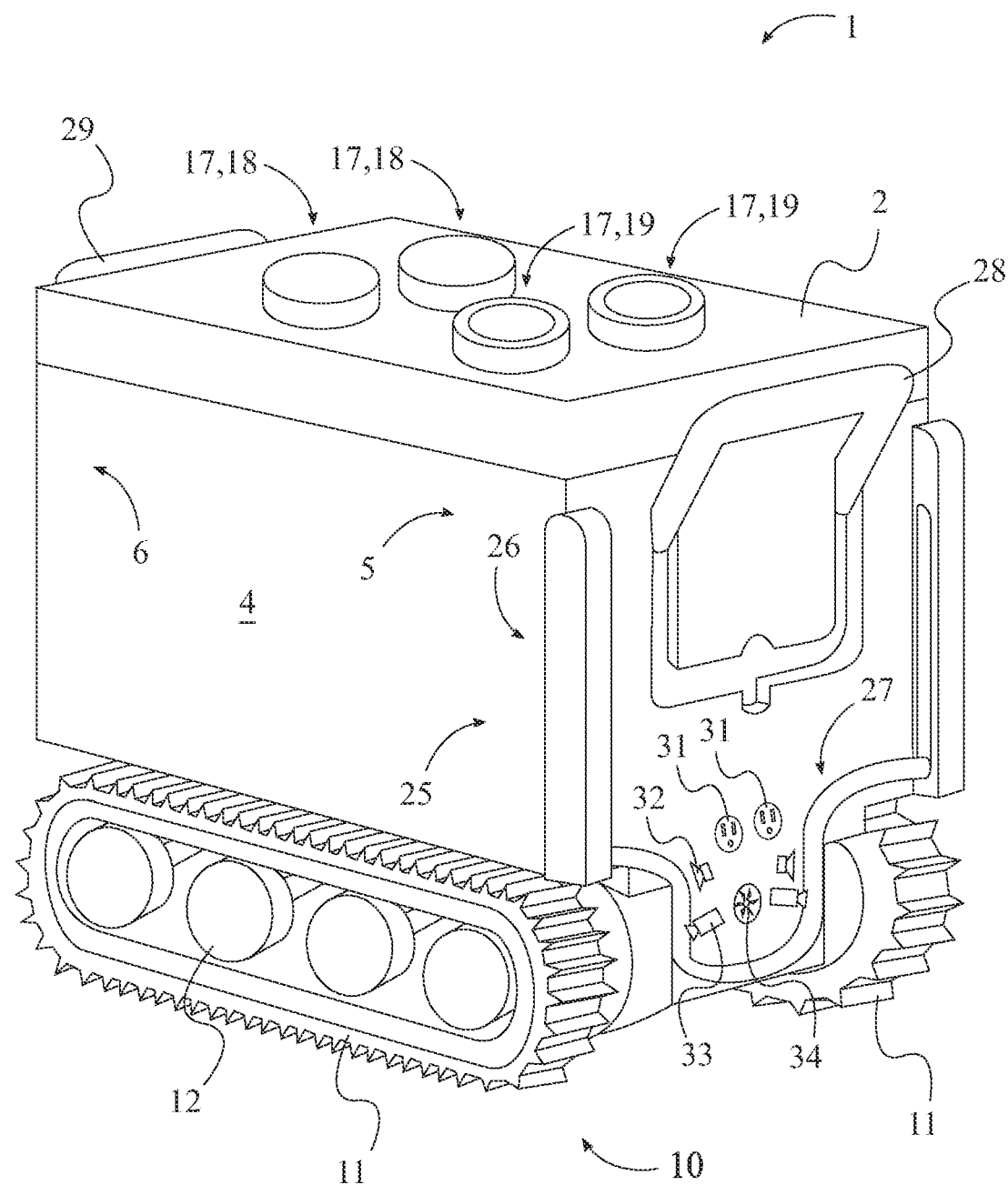
FIG. 2 is a right perspective view of the present invention.

Manual movement of the present invention is facilitated through the employment of accessible handles. To this end, the present invention may further comprise an adjustable handle 25, as shown in FIG. 2. The adjustable handle 25 is a generally rigid unit that may extend to an appropriate length to allow easy and ergonomic grasping and subsequent manipulation of the thermally-insulative receptacle 1. The insulative body 4 may extend longitudinally between a proximal body end 5 and a distal body end 6. The proximal body end 5 and the distal body end 6 are opposing ends of the insulative body 4. The adjustable handle 25 may be integrated into the insulative body 4 adjacent to the proximal body end 5. Thus, the user may utilize the adjustable handle 25 to shift the center of gravity of the present invention and its contents over the plurality of receptacle wheels 9, thereby facilitating manual movement of the present invention.

The adjustable handle 25 must be capable of elongating to a desirable length in order to provide optimal leverage for the user. To this end, the adjustable handle 25 may comprise a proximal handle portion 26 and a distal handle portion 27, as shown in FIG. 2. The proximal handle portion 26 is a generally hollow, elongated, rigid unit which connects to the proximal body end 5. The distal handle portion 27 is a generally elongated, rigid unit which provides an intuitive grasping mechanism for the user. The proximal handle portion 26 may be rotatably connected to the insulative body 4. In this way, the proximal handle portion 26 may manipulate the position of the insulative body 4 while allowing for adjustment of the pulling angle of the user. The distal handle portion 27 may be telescopically connected to the proximal handle portion 26 opposite the insulative body 4 along the proximal handle portion 26. This arrangement allows the adjustable handle 25 to expand to a desirable size during use.

Figure 3:
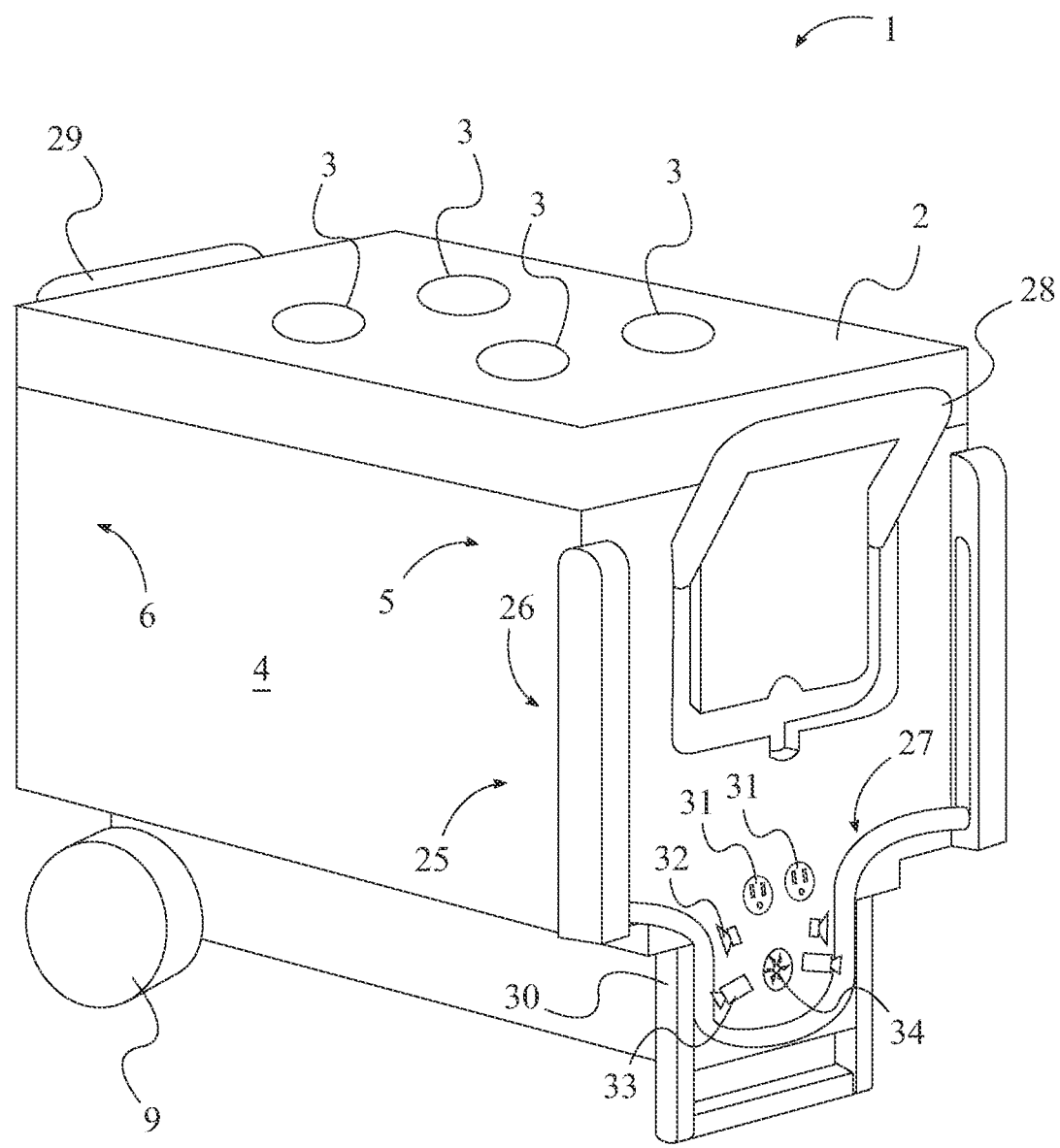
FIG. 3 is a right perspective view of the present invention with the tracked wheel assembly removed.

A user of the present invention may further wish to carry the thermally-insulative receptacle 1 over the ground. To enable this, the present invention may further comprise a first lateral handle 28 and a second lateral handle 29, as shown in FIG. 3. The first lateral handle 28 is a rigid unit that provides an intuitive grasping location for a user. Similarly, the second lateral handle 29 is a rigid unit that provides an intuitive grasping location for a user. The first lateral handle 28 may be rotatably mounted to the insulative body 4, adjacent to the proximal body end 5. This arrangement enables a user to grasp the first lateral handle 28 in order to adjust the position of the proximal body end 5. The second lateral handle 29 may be rotatably mounted to the insulative body 4, adjacent to the distal body end 6. Thus, the user may manipulate the position of the distal body end 6 by grasping the second lateral handle 29. The connection and positioning of the first lateral handle 28 and the second lateral handle 29 allow the user to move the thermally-insulative receptacle 1 by grasping both the first lateral handle 28 and the second lateral handle 29 for leverage.

Figure 7:
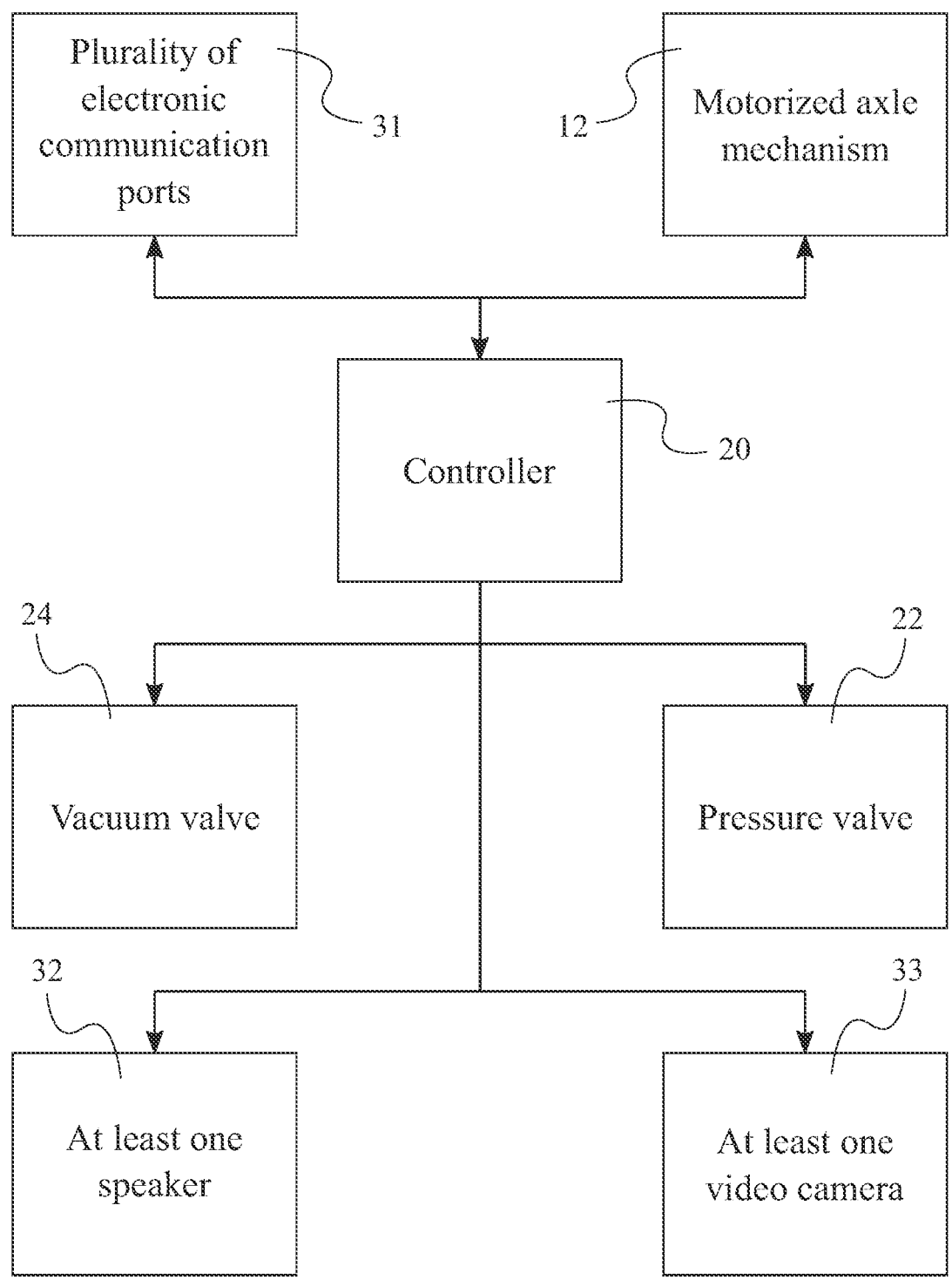
FIG. 7 is a flowchart illustrating the electronic connections of the present invention.

The present invention benefits from the ability to follow the user without direct user input. To enable this, the present invention may further comprise at least one video camera 33, as represented in FIG. 7. The at least one video camera 33 is a device capable of capturing image data over a period of time and relaying that data for subsequent use as a control input. The at least one video camera 33 may be integrated into the insulative body 4. This arrangement allows the at least one video camera 33 to capture visual data related to the surroundings of the insulative body 4. In an exemplary embodiment, the at least one video camera 33 may be mounted terminally upon the insulative body 4, thereby enabling data collection from the front and/or rear of the insulative body 4. The at least one video camera 33 may be electronically connected to the controller 20. Thus, data collected by the at least one video camera 33 may be utilized as an electronic input, enabling the controller 20 to generate command signals in response.

While the insulative body 4 is effective at maintaining a low inner temperature, additional components may be utilized in order to extend the longevity of ice within the present invention. To this end, the present invention may further comprise a plurality of cooling fans 34, as shown in FIG. 6. The plurality of cooling fans 34 is a set of rotating propeller blades designed to direct the flow of proximal air. The plurality of cooling fans 34 may be integrated into the insulative body 4. This arrangement enables the plurality of cooling fans 34 to direct external air towards the ice basket 13. The plurality of cooling fans 34 may be oriented towards the insulative body 4. Thus, air may be cooled as it masses into the insulative body 4 through the plurality of cooling fans 34. The plurality of cooling fans 34 may be electronically connected to the controller 20. In this way, the plurality of cooling fans 34 may be activated based upon commands from the controller 20. In an alternative embodiment, the plurality of cooling fans 34 may be reversible, thereby enabling removal of warm air from within the insulative body 4. In an alternative embodiment, a pair of fans from the plurality of cooling fans 34 may be oriented in opposing directions, thereby enabling removal of warm air from within the insulative body 4 while simultaneously allowing for input of cold air into the insulative body 4.

A user of the present invention may wish to utilize the present invention to generate a communal gathering area and may therefore benefit from the ability to play music or otherwise generate sound that originates from the thermally-insulative receptacle 1. To allow for this, the present invention may further comprise at least one speaker 32, as represented in FIG. 7. The at least one speaker 32 is a device capable of converting electronic signals into sound waves and subsequently amplifying and projecting those sound waves over an area. The at least one speaker 32 may be integrated into the insulative body 4. This arrangement allows for intuitive arrangement of the at least one speaker 32 during use. The at least one speaker 32 may be oriented away from the insulative body 4. In this way, the at least one speaker 32 may project away from the insulative body 4. The at least one speaker 32 may also be electronically connected to the controller 20. Thus, the at least one speaker 32 may receive electronic signals and convert them into desirable sounds.

The ability of the present invention to function as a communal hub is enhanced through the provision of different electronic plugs, ports, and other technologies. To this end, the present invention may further comprise a plurality of electronic communication ports 31, as represented in FIG. 7. The plurality of electronic communication ports 31 is a set of electrical outlets, wired chargers, wireless chargers, universal serial bus (USB) ports, audio/visual (AV) inputs, and more that allow a user to connect external mobile devices to the thermally-insulative receptacle 1. The plurality of electronic communication ports 31 may be integrated into the insulative body 4. This arrangement ensures that the plurality of electronic communication ports 31 is easily accessible to users. The plurality of electronic communication ports 31 may be electronically connected to the controller 20. Thus, the plurality of electronic communication ports 31 may receive necessary power and may transmit signals to and receive signals from the controller 20 during use.

A user may wish to rest the thermally-insulative receptacle 1 in a standing position with contents balanced within. To facilitate this, the present invention may further comprise a receptacle kickstand 30, as shown in FIG. 3. The receptacle kickstand 30 is a rigid unit capable of supporting the thermally-insulative receptacle 1 above the ground. The insulative body 4 may comprise a proximal body end 5 and a distal body end 6. The proximal body end 5 and the distal body end 6 are positioned on opposing ends of the insulative body 4. The receptacle kickstand 30 may be slidably connected to the insulative body 4 adjacent to the proximal body end 5, wherein the receptacle kickstand 30 is configured to be displaced between a stowed position and a deployed position. The stowed position allows the user to transport the present invention without interference from the receptacle kickstand 30. The deployed position allows the insulative body 4 to receive support from the receptacle kickstand 30. The plurality of receptacle wheels 9 may be positioned adjacent to the distal body end 6. In this way, the receptacle kickstand 30 and the plurality of receptacle wheels 9 may together support the weight of the thermally-insulative receptacle 1 and the contents therein.

A user of the present invention may wish to interact with the thermally-insulative receptacle 1 directly, with non-remote controls. In an exemplary embodiment, the present invention may therefore further comprise a liquid crystal display (LCD) screen. The LCD screen is a visual interface that enables users to interact with the present invention. The LCD screen may be electronically connected to the controller 20. This arrangement enables inputs from the LCD screen to be processed by the controller 20 and subsequently relayed to appropriate subsystems within the present invention as applicable.

Although the invention has been explained in relation to its preferred embodiment, it is to be understood that many other possible modifications and variations can be made without departing from the spirit and scope of the invention as hereinafter claimed.

What is claimed is:

1. A portable beach cooler comprising:
   a thermally-insulative receptacle;
   a plurality of receptacle wheels;
   a tracked wheel assembly;
   an ice basket;
   a controller;
   the thermally-insulative receptacle comprising an insulative lid and an insulative body;
   the insulative lid being hingedly connected onto the insulative body;
   the insulative lid being hermetically sealed over the insulative body;
   the plurality of receptacle wheels being rotatably mounted onto the thermally-insulative receptacle, opposite the insulative lid;
   the thermally-insulative receptacle being removably attached to the tracked wheel assembly;
   the ice basket being adjustably mounted within the insulative body; and
   the tracked wheel assembly and the ice basket being electronically connected to the controller; and
   a pressure receptacle;
   a pressure valve;
   a vacuum receptacle;
   a vacuum valve;
   the pressure receptacle and the vacuum receptacle being mounted within the insulative body;
   the pressure valve being operatively integrated into the pressure receptacle;
   the vacuum valve being operatively integrated into the vacuum receptacle;
   the pressure receptacle being operatively connected to the basket height adjustment mechanism through the pressure valve;
   the vacuum receptacle being operatively connected to the basket height adjustment mechanism through the vacuum valve; and
   the pressure valve and the vacuum valve being electronically connected to the controller.

2. The portable beach cooler as claimed in claim 1 comprising:
   a plurality of permeable beverage supports;
   the insulative lid further comprising a plurality of cupholder openings;
   the plurality of cupholder openings traversing through the insulative lid;
   the plurality of permeable beverage supports being positioned within the insulative body; and
   the plurality of permeable beverage supports being terminally connected to the plurality of cupholder openings.

3. The portable beach cooler as claimed in claim 2 comprising:
   at least one invertible cupholder cap;
   each of the at least one invertible cupholder cap comprising a closed cap portion and an open cap portion;
   each of the at least one invertible cupholder cap being attached onto one of the plurality of cupholder openings; and
   the open cap portion being positioned adjacent to the insulative lid.

4. The portable beach cooler as claimed in claim 3 comprising:
   the closed cap portion being positioned offset from the insulative lid; and
   the closed cap portion being positioned opposite the plurality of permeable beverage supports.

5. The portable beach cooler as claimed in claim 3 comprising:
   the closed cap portion being positioned offset from the insulative lid; and
   the closed cap portion being positioned adjacent to the plurality of permeable beverage supports.

6. The portable beach cooler as claimed in claim 1 comprising:
   the ice basket comprising a basket height adjustment mechanism and a basket gate;
   the basket gate being hingedly connected to the ice basket;
   the basket gate being positioned adjacent to the basket height adjustment mechanism; and
   the ice basket being mounted onto the basket height adjustment mechanism.

7. The portable beach cooler as claimed in claim 1 comprising:
   the thermally-insulative receptacle further comprising a drainage opening and a drainage plug;
   the drainage opening traversing through the insulative body;
   the drainage opening being positioned opposite the insulative lid; and
   the drainage plug being hermetically and removably positioned into the drainage opening.

8. The portable beach cooler as claimed in claim 1 comprising:
   the tracked wheel assembly comprising a motorized axle mechanism and a plurality of tracked wheels;
   the plurality of tracked wheels being rotatably mounted onto the motorized axle mechanism;
   the motorized axle mechanism being removably attached to the thermally-insulative receptacle; and
   the motorized axle mechanism being positioned adjacent to the plurality of receptacle wheels.

9. The portable beach cooler as claimed in claim 1 comprising:
   an adjustable handle;
   the insulative body extending longitudinally between a proximal body end and a distal body end; and
   the adjustable handle being integrated into the insulative body adjacent to the proximal body end.

10. The portable beach cooler as claimed in claim 9 comprising:
    the adjustable handle comprising a proximal handle portion and a distal handle portion;

the proximal handle portion being rotatably connected to the insulative body; and the distal handle portion being connected to the proximal handle portion opposite the insulative body along the proximal handle portion.

11. The portable beach cooler as claimed in claim 9 comprising:

a first lateral handle;

a second lateral handle;

the first lateral handle being rotatably mounted to the insulative body;

first lateral handle being positioned adjacent to the proximal body end;

the second lateral handle being rotatably mounted to the insulative body; and the second lateral handle being positioned adjacent to the distal body end.

12. The portable beach cooler as claimed in claim 1 comprising:

at least one video camera;

the at least one video camera being integrated into the insulative body; and the at least one video camera being electronically connected to the controller.

13. The portable beach cooler as claimed in claim 1 comprising:

a plurality of cooling fans;

the plurality of cooling fans being integrated into the insulative body;

the plurality of cooling fans being oriented towards the insulative body; and the plurality of cooling fans being electronically connected to the controller.

14. The portable beach cooler as claimed in claim 1 comprising:

at least one speaker;

the at least one speaker being integrated into the insulative body;

the at least one speaker being oriented away from the insulative body; and the at least one speaker being electronically connected to the controller.

15. The portable beach cooler as claimed in claim 1 comprising:

a plurality of electronic communication ports;

the plurality of electronic communication ports being integrated into the insulative body; and the plurality of electronic communication ports being electronically connected to the controller.

16. The portable beach cooler as claimed in claim 1 comprising:

a receptacle kickstand;

the insulative body comprising a proximal body end and a distal body end;

the receptacle kickstand being slidably connected to the insulative body adjacent to the proximal body end, wherein the receptacle kickstand is configured to be displaced between a stowed position and a deployed position; and the plurality of receptacle wheels being positioned adjacent to the distal body end.

* * * * *